Oct. 28, 1958 M. R. RICHMOND ET AL 2,858,533
AUTOMATIC COURSE INDICATING DEVICE
Filed Oct. 7, 1946 2 Sheets-Sheet 1
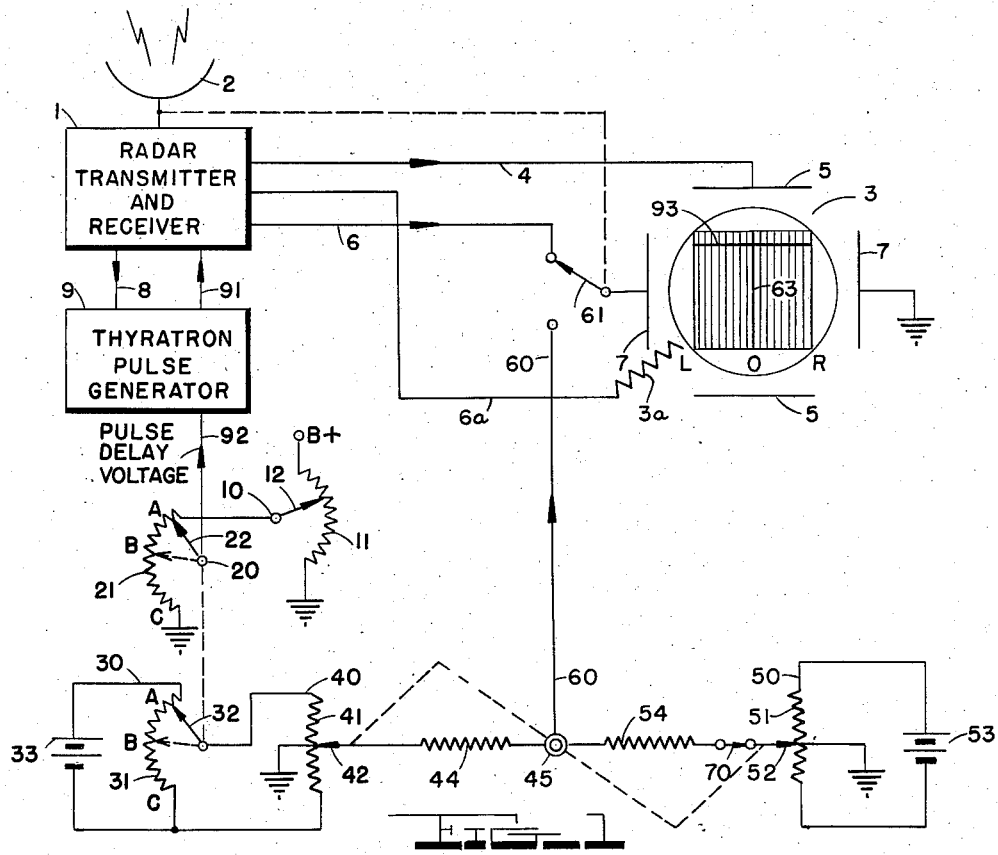
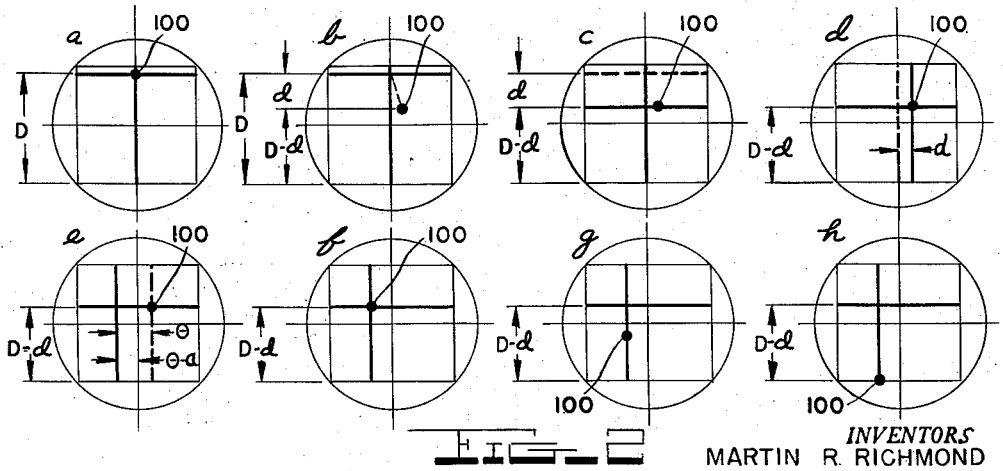
INVENTORS
MARTIN R. RICHMOND
MICHAEL M. DAVIS JR.
BY
*M. A. Hayes*
ATTORNEY

2,858,533

AUTOMATIC COURSE INDICATING DEVICE

Martin R. Richmond and Michael M. Davis, Jr., United States Navy

Application October 7, 1946, Serial No. 701,630

2 Claims. (Cl. 343—16)

(Granted under Title 35, U. S. Code (1952), sec. 266)

This invention relates to a radar or other radio navigational aid, and more particularly to an automatic drift correction device incorporated therein for obtaining a collision course with a target or radio beacon.

Radars and other radio navigational devices may be employed to indicate how to turn a moving vessel such as an airplane or ship in the azimuth plane, or in the elevation plane, or both, until the vessel is headed directly at a target or a radio beacon. In order to simplify the presentation, the invention will be described as in connection with azimuth correction.

If there is no drift due to wind or sea currents, and if the target or beacon is stationary or is moving only along the same line of travel as the moving vessel, then once the plane or ship or other vessel is headed toward the object in question it will continue on a "collision course" with that object. That is, by continuing on the original heading its position in the horizontal will eventually coincide with that of the target or beacon.

However, if these are wind or sea currents having a component at right angles to the heading of the vessel, or if the target or beacon has a component of motion at right angles to the original heading of the vessel, then the original heading will not constitute a collision course. In such a case, to obtain a collision course a correction must be made in the original heading by turning the vessel toward the direction in which the target is moving.

It is to be noted that the correction to the original heading is made with consideration to the relative motion of the vessel and the target. It is unnecessary to consider the drift of the vessel relative to the ground or sea, and it is unnecessary to consider the motion of the target relative to the ground or sea. Correction can be made by merely considering the relative motion of the vessel and the target.

The usual method of applying this correction for relative motion of vessel and target so as to produce a collision course is to observe how fast the target moves off the initial collision course and attempt to estimate the correction needed. This is a time-consuming and difficult trial and error method, however, since it is only the operator's guess as to how large a correction should be made each time, and several corrections may therefore be necessary.

Accordingly, it is an object of this invention to provide a device to be incorporated in a radar or other radio navigational aid which will automatically compute and apply the correction in heading, if any, which is required to bring a moving vessel on to a collision course with a given object after an original heading is first determined by the operator.

It is another object of the invention to provide such a device which will be operated by a setting which requires no exercise of trained judgment on the part of the operator, thus reducing greatly the time necessary to train operators for radars and other radio navigational aids to be used in plotting collision courses.

It is also an object of the invention to provide such a device which is operated by a simple setting of controls thus reducing the time and attention which must be spent by the operator in obtaining a collision course. This will make possible a considerably shorter bombing run, in the case of a bombing aircraft, for instance, and so will reduce the possibility of enemy defense action.

A more complete understanding of this invention will be obtained by reference to the following detailed description and the accompanying drawings, in which only one preferred embodiment of the invention has been illustrated:

Fig. 1 is a diagrammatic representation of an embodiment of this invention.

Fig. 2 illustrates a type of indication appearing on the indicator of a radar used with an embodiment of this invention.

Figure 3:
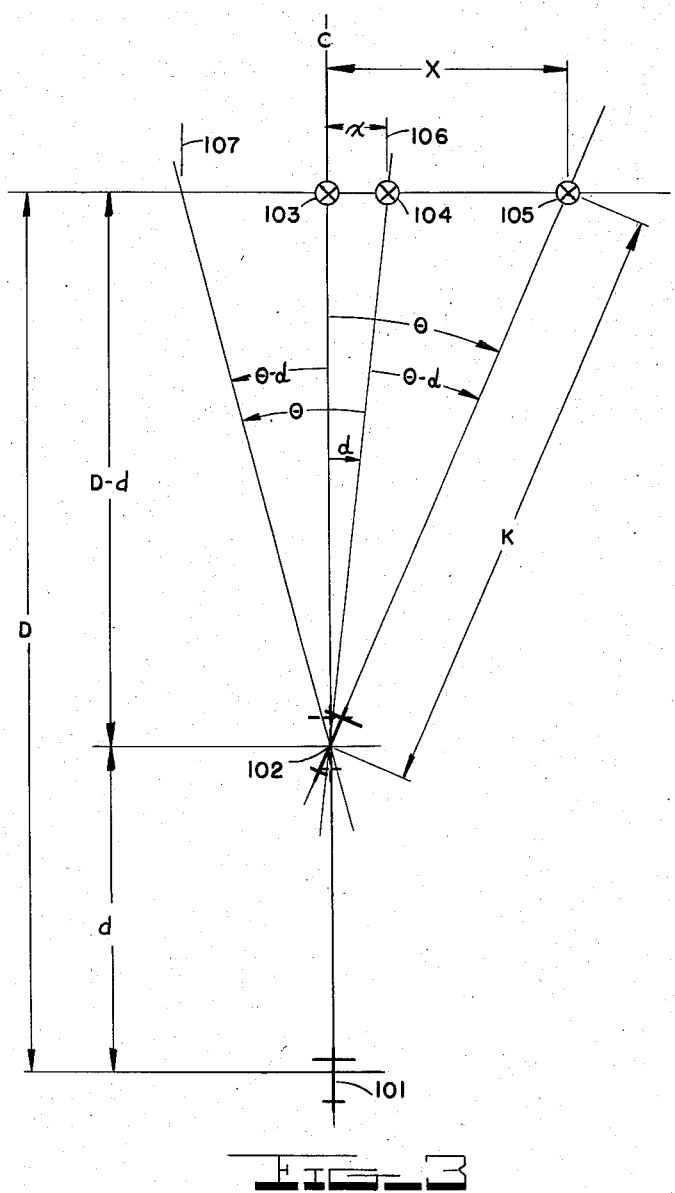

Fig. 3 will be used to explain a mathematical basis of the invention.

The exemplary embodiment of this invention will now be more specifically described in connection with Figs. 1, 2 and 3.

Referring to Fig. 1, radar transmitter and receiver 1 sends out and receives radio waves from directional antenna 2 which moves back and forth covering a sector of area in front of an airplane or other vessel. Radar indicator 3 has sweep deflector means 7 which, when connected by switch 61 to lead 6, causes the sweep to move back and forth in accordance with and in synchronism with the motion of antenna 2. Switch 61 is mechanically operated by antenna 2 so that when the antenna is at one of its extreme positions, switch 61 makes contact with lead 60 for a short period during which period an intensifying square wave of voltage is applied to the control electrode 3a through lead 6a of indicator 3 causing a bright lubber line 63 on the indicator screen. The voltage of lead 60 is such that lubber line 63 normally is positioned in the center O of the indicator screen which corresponds with the direction directly ahead of the airplane or vessel. Potentiometers 31, 41 and 51 are, as hereinafter described, operated to adjust the magnitude of the voltage appearing on lead 60 and thereby to determine the position of lubber line 63 on the face of indicator 3. The video signal voltages from the radar receiver corresponding to objects detected by the radar are also applied to the control electrode 3a of indicator 3 causing an indication at the corresponding range and angle relative to the longitudinal axis of the airplane.

A saw-tooth-shaped voltage in phase with and similar to the sweep voltage applied to deflector means 5 is obtained from radar 1 and connected by lead 8 to thyratron pulse generator 9. A pulse is generated by the thyratron each time the input saw-tooth-shaped voltage applied to the grid of the thyratron rises to a value which in relation to the cathode biasing voltage applied by lead 92 is such that the thyratron will fire. The output pulse is applied by lead 91 to radar 1 from which it is applied along with the video signal voltages and lubber line voltage to the control electrode 3a of indicator 3. The pulses appear on the face of indicator 3 as range (distance) line 93. The potentiometers 11 and 21 determine the position of range line 93 on the face of indicator 3.

Initially, potentiometer knob 20 is always set with mechanically connected contact arms 22 and 32 in the A positions, and with potentiometer knob 45 in the balanced centered position as shown.

Referring now to Fig. 2 as well as Fig. 1 for the method of operation of the navigational system, Fig. 2a shows the initial appearance of the indicator face when the airplane has been pointed directly towards target 100 and potentiometer knob 10 has been turned until range line 93 intersects target 100. The airplane is then held on its initial course. Because of the effect of drift of the airplane and motion of the target, the target indication 100 will not move down along centered lubber line 63 but will move off to one side. Fig. 2b shows the position of target 100 after airplane has gone distance d. Range line 93 is made to intersect target 100 as shown in Fig. 2c by turning knob 20 to position B.

Lubber line 63 is also moved through angle α to intersect target 100, as shown in Fig. 2d, by turning potentiometer knob 45 causing a voltage to be applied through lead 60 to deflection means 7. Normally-closed switch 70 is then opened removing the effect of the voltage from source 53 and causing the voltage applied to deflection means 7 through lead 60 to shift lubber line 63 in the opposite direction by an angle θ as shown in Fig. 2e. The relationship of the voltages on lead 60 before and after opening switch 70 are such that if the airplane is turned through angle θ, the airplane will be on a collision course with the target. The voltages in the potentiometer network will be explained later. The airplane is turned an angle θ by turning until the target indication 100 is observed to be on lubber line 63 as shown in Fig. 2f.

The airplane is kept on the collision course by keeping target indication 100 on lubber line 63 as target indication moves down lubber line as illustrated in Fig. 2g. Fig. 2h shows the position of target indication 100 when airplane is directly over target.

The mathematical basis of the exemplary embodiment of this invention will now be described with reference to Fig. 3. Only the motion of the target relative to the airplane which is at right angles to the direction of the airplane needs to be considered.

Initially, airplane at position 101 flies directly toward the target at position 103 a distance D away. When the airplane flies a distance d on its initial heading to position 102, the target moves a distance x to position 104. The potentiometer network of Fig. 1 is adjusted to supply a voltage to move the lubber line a distance x corresponding to angle α from the center line to position 106. The airplane must be turned an angle θ in order to intercept the target at position 105. When switch 70 of Fig. 1 is opened, the potentiometer network supplies a voltage of opposite polarity to move the lubber line a distance corresponding to angle θ−α left from the center line to position 107. Then if the airplane turns right when at position 102 until the indication of the target at position 104 moves to lubber line at position 107, the airplane will have turned through an angle θ and will intercept the target at position 105.

The trigonometric relationships in Fig. 3 are as follows:

$$\tan \theta = \frac{X}{D-d}$$

$$\tan \alpha = \frac{x}{D-d}$$

$$\frac{\tan \theta}{\tan \alpha} = \frac{X}{x} = \frac{D}{d}$$

When angles α and θ are small, it can be said for all practical purposes that the tangent of the angle is equal to the angle and the actual distance moved K is equal to D−d.

Therefore:

$$\frac{\theta}{\alpha} = \frac{D}{d}$$

and $$\theta = \frac{D}{d} \alpha$$

$$\theta - \alpha = \left(\frac{D}{d} - 1\right) \alpha$$

It now remains to be shown that the voltage on lead 60 from the potentiometer network after switch 70 is opened is $$\left(\frac{D}{d} - 1\right)$$

times the voltage before switch 70 is opened and is of opposite polarity.

In potentiometers 21 and 31 of Fig. 1:

$$\frac{\text{Voltage } AB}{\text{Voltage } AC} = \frac{\text{distance } d}{\text{distance } D}$$

because the impedance of potentiometer 21 is very high compared with the impedance of potentiometer 11, and the impedance of potentiometer 41 is very high compared with the impedance of potentiometer 31.

Voltage source 33 is equal to voltage source 53.

In the formulas that follow, voltages at various points in Fig. 1 are represented by V followed by the corresponding numeral.

Under the initial conditions:

$$V_{30} = V_{40} = V_{50}$$
$$V_{60} = 0$$

After knob 20 is turned from A to B, a distance corresponding to d:

$$V_{40} = V_{50}(D-d)/D$$
$$V_{60} = 0$$

As indicated in the drawings knob 45 is common to taps 42 and 52 and controls both taps so that the voltage appearing at these taps vary in opposed directions upon rotation of the knob. After knob 45 has been turned from its normal position through an angle corresponding to α, the voltage at tap 42 which shall be designated $V_{42}$ becomes a fraction of $V_{40}$, likewise the voltage at tap 52 becomes a similar fraction of $V_{50}$. Thus using the relation established in the previous equation of $$V_{40} = V_{50}\left(\frac{D-d}{D}\right)$$

to obtain the voltage at the tap 42:

$$V_{42} = V_{52}\left(\frac{D-d}{D}\right)$$

Thus after knob 45 has been turned through an angle corresponding to the angle α, the voltage $V_{60}$ equals the difference between the voltage at taps 42 and 52. Thus $$V_{60} = V_{52} - V_{42}$$

but since $$V_{42} = V_{52}\left(\frac{D-d}{D}\right)$$

$$V_{60} = V_{52}\left(1 - \frac{D-d}{D}\right)$$

$$= V_{52}\left(\frac{d}{D}\right)$$

After switch 70 is opened, the voltage on line 60 simply equals the voltage at the tap 42, or $$V_{60} = -V_{42}$$

Thus, substituting the foregoing expression for $V_{42}$, $V_{60}$ becomes, $$V_{60} = -V_{42} = -V_{52}\left(\frac{D-d}{D}\right)$$

$$= -\frac{D}{d}\left(\frac{D-d}{D}\right) V_{60} \text{ switch closed}$$

$$= -\left(\frac{D}{d} - 1\right) V_{60} \text{ switch closed}$$

Therefore, when switch 70 is opened, lubber line 63 is moved a distance corresponding to an angle from the center line $$\left(\frac{D}{d} - 1\right)$$

times the angle α from the center line and in the opposite direction. The lubber line moves a total distance corresponding to an angle equal to $D/d$ times the angle α.

It will be understood that the embodiment shown and described is exemplary only, and that the scope of this invention will be determined with reference to the appended claims.

The invention described herein may be manufactured and used by or for the Government of the United States of America for governmental purposes without the payment of any royalties thereon or therefor.

What is claimed is:

1. In a navigational system used on a craft having an initial position for determining a collision course with an object having an initial position and a component of motion relative to the craft at right angles to the direction of the craft when directed at the object a distance D away, a course correction device comprising: an indicator including a cathode ray tube having a screen, deflection elements, and an intensifying element, means for applying a signal to said intensifying element for providing a lubber line on said screen when the craft is oriented in a reference direction, means connected to said deflection elements for deflecting said lubber line a distance representative of the angle between the direction of the craft toward the position of the object when the craft and the object are located at their respective initial positions and the direction of the craft toward the position of the object when the craft has traveled a distance $d$ from the initial position of the craft toward the initial position of the object and the object has traveled a predetermined distance from the initial position of the object, and means connected to said deflection elements for deflecting said lubber line a distance representative of $(D-d)/d$ times said angle.

2. In a navigational system used on a craft having an initial position for determining a collision course with an object having an initial position and a component of motion relative to the craft at right angles to the direction of the craft when directed at the object a distance D away, a course correction device comprising: an indicator including a cathode ray tube having a screen, deflection elements and an intensifying element, means for applying a first signal to said intensifying element for providing a lubber line on said screen when the craft is oriented in a reference direction, means for applying a second signal to said intensifying element for providing a range line at a position on said screen representative of the initial position of said craft, means connected to said intensifying element for displacing said range line a distance on the screen representative of the distance $d$ traveled from the initial position of the craft in a direction toward the initial position of the object, means connected to said deflection elements for deflecting said lubber line a distance representative of the angle between the direction of the craft toward the position of the object when the craft and the object are located at their respective initial positions and the direction of the craft toward the position of the object when the craft has traveled a distance $d$ from the initial position of the craft toward the initial position of the object and the object has traveled a predetermined distance from the initial position of the object, and means connected to said deflection elements for deflecting said lubber line a distance representative of $(D-d)/d$ times said angle.

References Cited in the file of this patent

UNITED STATES PATENTS

| | | |
|---|---|---|
| 2,418,465 | Doba | Apr. 8, 1947 |
| 2,419,205 | Feldman | Apr. 22, 1947 |
| 2,420,017 | Sanders | May 6, 1947 |
| 2,425,330 | Kenyon | Aug. 12, 1947 |
| 2,691,163 | Richmond | Oct. 5, 1954 |